Sept. 28, 1965      A. J. KOSCH      3,208,393

GEAR TYPE PUMP OR MOTOR

Filed July 23, 1963

INVENTOR.
ALOIS J. KOSCH

BY

Hood, Gust & Irish
Attorneys

United States Patent Office 3,208,393
Patented Sept. 28, 1965

3,208,393
GEAR TYPE PUMP OR MOTOR
Alois J. Kosch, Box 707, Columbus, Nebr.
Filed July 23, 1963, Ser. No. 296,965
9 Claims. (Cl. 103—126)

The present invention relates to a gear type pump or motor, and the primary object of the invention is to improve the efficiency of such devices. Throughout the present specification, the illustrated embodiment of my invention will be considered as a motor, unless the contrary is specifically indicated, though it will be understood that the same mechanism may alternatively be used as a pump.

The well known gear type pump is less complicated and less expensive than other types of pumps, but is also less efficient in the forms in which it has heretofore been known, primarily because of the escape of motive liquid both axially and radially from the peripheries of the meshing gears. Operative clearance must be provided between housing parts and the axial end surfaces of the gears, and those clearances become exaggerated under the distorting force of pressure liquid. Clearance must also be provided between the radially-distal ends of the gear teeth and the housing parts; and even if such clearance were not initially provided it would arise, in use of the mechanism, through wear.

The primary object of the present invention, then, is to provide means, movable relative to the gears and including parts movable relative to each other, so designed and arranged as to inhibit axial and radial escape of motive liquid from the gear teeth within a region adjacent the region in which the teeth of one gear mesh with the teeth of the other.

A further object of the invention is to provide, in a device of the class described, a wear block movable relative to the gears and hydraulically urged toward cooperative contact with the radially distal ends of the gear teeth in a region adjacent the meshing region, as well as other means, hydraulically pressed against the opposite end faces of the gears, spanning the region of contact between the gears and the wear block surfaces, and preferably hydraulically urged toward contact with said wear block surfaces to inhibit axial escape of pressure fluid from said region adjacent the meshing region.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
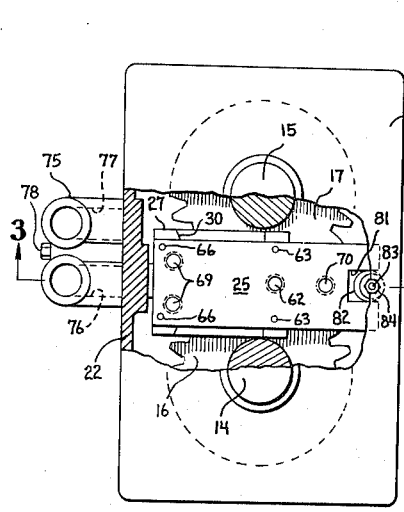
FIG. 1 is a top plan view of a pump or motor constructed in accordance with the present invention, parts being broken away for clarity of illustration.
Figure 2:
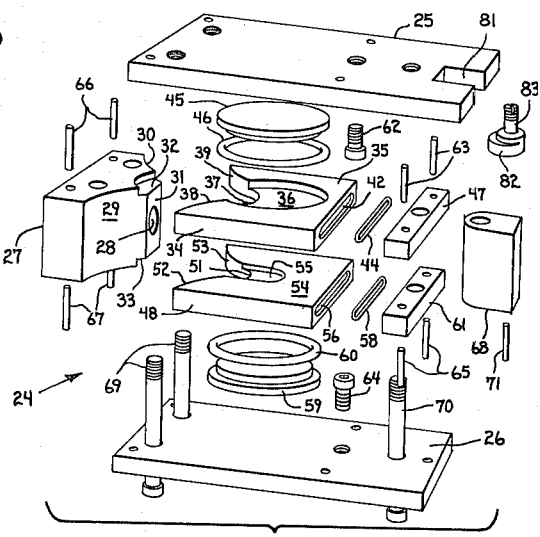
FIG. 2 is an exploded view of a sealing assembly constituting a part of my present invention.
Figure 3:
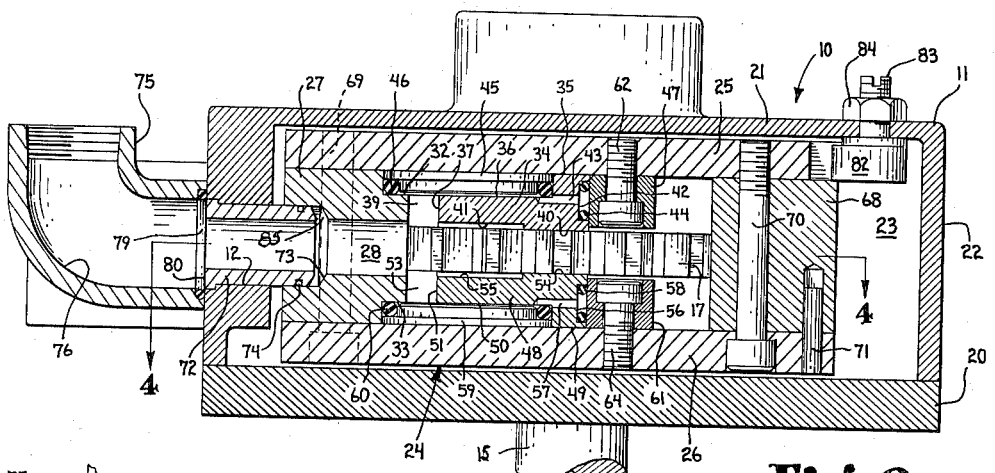
Figure 4:
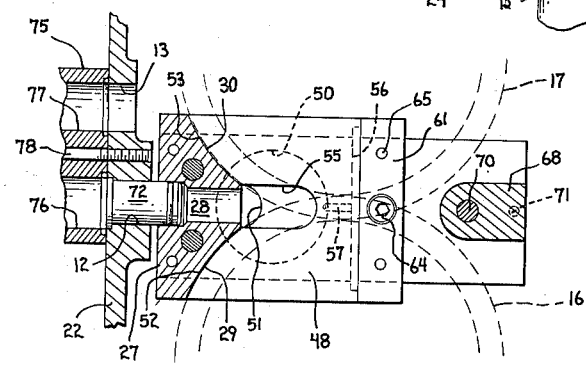

FIG. 3 is a sectional view taken substantially on the line 3—3 of FIG. 1, drawn to an enlarged scale, and illustrating the sealing assembly of FIG. 2 in cooperative association with the other elements of such a pump; and FIG. 4 is a fragmentary, horizontal section taken substantially on the line 4—4 of FIG. 3 and drawn to a reduced scale, fragments of the meshing gears being illustrated in broken lines.

The device of the present disclosure finds particular utility in an organization of the character disclosed in my copending application Serial No. 273,633, filed April 17, 1963, for Gear Type Transducer; and the reference numeral 10 indicates generally the hydraulic motor which is indicated by the same reference numeral in the said copending application. As herein shown, said motor includes a housing comprising a shell 11 and a floor plate 20, said shell comprising a roof 21 and side walls 22 cooperating with the floor plate 20 to define a chamber 23 closed except for a lateral or pressure port 12 and a second port 13 which, in the illustrated embodiment of my invention, is also laterally arranged, though such arrangement is not essential. Shafts 14 and 15 are journalled in said housing upon parallel axes equally and oppositely spaced from the axis of the port 12 and disposed in a common plane perpendicular to said port axis. Gears 16 and 17 are fixed, respectively, to said shafts 14 and 15 and mesh with each other in a region aligned with said port axis. At least one of the shafts 14 and 15 penetrates the floor plate 20 for connection to mechanism to be driven.

A sealing assembly, embodying the novel features of the present invention, is indicated generally by the reference numeral 24. Said assembly includes an upper back-up plate 25 and a lower back-up plate 26, said plates being smaller in all dimensions than the chamber 23. Sandwiched between the plates 25 and 26 adjacent one end thereof is a wear block 27 formed with a passage 28 therethrough, said passage being aligned with the meshing region of the gears 16 and 17 and being adapted to be positioned within the chamber 23 in coaxial relation to the port 12. The block 27 is formed with opposed, arcuate surfaces designed and arranged to confront and to conform to the external peripheries of the gears 16 and 17 respectively in a region adjacent the meshing region between those gears. The surfaces 29 and 30 are separated by a planar surface 31 which is substantially parallel to the plane common to the axes of the shafts 14 and 15. The surfaces 29 and 30 extend in opposite directions beyond the planes of the axial ends of the gears 16 and 17 and into contact with the inner surfaces of the plates 25 and 26. Each end of the wear block 27, however, is recessed as shown to define a shoulder 32 and a shoulder 33 for a purpose which will appear, A top wear plate 34 is formed in its upper surface 35 with a pocket 36 and is medially cut away near its forward end, as at 37. The forward end of the wear plate 34 is formed to provided flaring surfaces 38 and 39 arranged and designed to confront and to conform to the wear block surfaces 29 and 30 in their areas above the plane of the top ends of the gears 16 and 17; and the plate 34 is so proportioned that, when its lower surface 40 bears upon the upper ends of the gears 16 and 17 its upper surface 35 will substantially bear upon the lower surface of the back-up plate 25. Said lower surface 40 of the plate 34 is formed with a pocket 41 opening into the cut away region 37.

At its rear end, the plate 34 is preferably formed with a cavity 42, and a passage 43 provides open communication between the pocket 36 and the cavity 42. An obround washer 44 is received in the cavity 42, as shown. A piston 45 is mounted in the pocket 36 and an O-ring 46 is snugly sleeved on the reduced lower end of said piston and sealingly bears against the upstanding walls defining the pocket 36 and the shoulder 32 to provide a seal for said piston. A back-up block 47 is secured to the plate 25 in a position to act as an abutment for the plate 34 and has sealing contact with the washer 44 to close the cavity 42. The washer 44 and the O-ring 46 are of course, resiliently compressible to maintain their effective sealing actions during limited movements of the associated parts.

A bottom wear plate 48 is formed in its lower surface 49 with a pocket 50 and is medially cut away near its forward end, as at 51. The forward end of the wear plate 48 is formed to provide flaring surfaces 52 and 53 arranged and designed to confront and to conform to the wear block surfaces 29 and 30 in their areas below the plane of the bottom ends of the gears 16 and 17; and the plate 48 is so proportioned that, when its lower surface 49 bears upon the upper surface of the back-up plate 26, its upper surface 54 will substantially bear upon the lower ends of the gears 16 and 17. Said upper surface 54 of the plate 48 is formed with a pocket 55 opening into the cut away region 51.

At its rear end, the plate 48 is preferably formed with a cavity 56, and a passage 57 provides open communication between the pocket 50 and the cavity 56. An obround washer 58 is received in the cavity 56, as shown. A piston 59 is mounted in the pocket 50 and an O-ring 60 is snugly sleeved on the reduced upper end of the piston 59 and sealingly bears against the upstanding walls defining the pocket 50 and the shoulder 33 to provide a seal for said piston. A back-up block 61 is secured to the plate 26 in a position to act as an abutment for the plate 48 and has sealing contact with the washer 58 to close the cavity 56. The washer 58 and the O-ring 60 are, of course, resiliently compressible to maintain their effective sealing actions during limited movements of the associated parts. A screw 62 and a pair of dowel pins 63 retain the block 47 in place on the plate 25 and a similar screw 64 and dowel pins 65 retain the block 61 in place on the back-up plate 26. Upper dowel pins 66 and lower dowel pins 67 act to hold the wear block 27 immovable relative to the plates 25 and 26. A spacer block 68 is sandwiched between the plates 25 and 26 at a point remote from the wear block 27; and the whole assembly is held together by screws 69 penetrating the plate 26 and the wear block 27 and threadedly engaging in the plate 25 and by a screw 70 penetrating the plate 26 and the spacer 68 and threadedly entering the plate 25. A dowel pin 71 is cooperatively engaged with the plate 26 and the spacer 68 to retain said spacer against movement relative to the screw 70.

A sleeve 72 is received in the port 12 and extends significantly into the chamber 23. The forward end of the wear block 27 telescopically receives the protruding end of the sleeve 72, an O-ring 74 seated in a groove in said sleeve providing a seal between the elements 27 and 72. A fitting 75 providing an inlet passage 76 and an outlet passage 77 is fixed to the side wall 22 of the housing 11 with said passages 76 and 77 in communicating registry, respectively, with the ports 12 and 13 in said wall. As shown, one or more screws 78 secure the fitting 75 in place on the shell 11; and an O-ring 79 provides a seal with the sleeve 72. It will be perceived that an end surface 80 of the sleeve 72 is exposed to inlet liquid pressure, and that the internal surface 85 of the wear block is likewise exposed to such pressure.

The assembly 24 is mounted in the chamber 23 and, as will be apparent from FIGS. 1 and 3, is free for limited movement therein in a plane parallel with the plane of the floor plate 20. In order to permit nice adjustment of the assembly so that the axis of the passage 28 shall be accurately aligned with the meshing region between the gears 16 and 17, the rear end of the upper back-up plate 25 is formed with a slot 81 in which is cooperatively received a cam 82 supported from a stem 83 which penetrates the roof 21 of the shell 11 and there receives a lock nut 84. It will be apparent that, when the nut 84 is loosened, the stem 83 may be turned in one direction or the other to shift the rear end of the assembly 24 upwardly or downwardly as viewed in FIG. 1. The slot 81 is so proportioned as to permit limited movement of the assembly 24 toward the right or left as viewed in FIG. 3.

It will be seen that the entire assembly 24 is hydraulically balanced within the chamber 23, except for the imbalance created by the surface 85. Thus, the assembly 24 is lightly urged toward the right as viewed in FIGS. 1 and 3, to hold the surfaces 29 and 30 in contact with the radially-distal ends of the teeth of the gears 16 and 17 in a region adjacent the meshing region between the gears. The cut-outs 37 and 51 open the pockets 36 and 50 to the pressure existing in the region above mentioned; and the passages 43 and 57 open the cavities 42 and 56 to that pressure. Thus, the wear plates 34 and 48 are urged into contact with the end surfaces of the gears 16 and 17 and said plates are also urged forwardly to press their flaring surfaces 38, 39, 52 and 53 against the wear block surfaces 29 and 30. Of course, if the back-up blocks 47 and 61 are positioned with great accuracy, the cavities 42 and 56, the washers 44 and 58 and the passages 43 and 57 may be eliminated; but we prefer the illustrated structure which compensates not only for slight manufacturing inaccuracies but also for wear between the gear teeth and the wear block surfaces 29 and 30.

Thereby, liquid under pressure which is supplied to the assembly through the passage 76, the sleeve 72 and the passage 28, is confined against escape either radially or axially from the above mentioned region. Since the gears mesh intimately, such liquid can escape only peripherally of the gears by forcing those gears to turn, the gear 16 in a counter clockwise direction and the gear 17 in a clockwise direction.

Although the back-up plates 25 and 26 will be somewhat distorted by working pressure, the pistons 45 and 59 will follow such distortion, and the O-rings 46 or 60 will prevent axial escape of liquid as a consequence of such distortion. The washers 44 and 58 are so dimensioned with respect to the cavities in which they are mounted that they will maintain, with the back-up blocks 47 and 61, effective sealing of the cavities 42 and 56.

Since the median regions of the surfaces 29 and 30 are held in actual bearing contact with the teeth of the gears 16 and 17, wear will occur, either on those teeth or on the median regions of the wear block surfaces, after long service. As such wear occurs, however, the whole assembly 24 will move toward the right to maintain the desired bearing contact between the gears and the wear blocks; and meantime, suitable flow-inhibiting contact between the wear block and the flaring surfaces of the wear plates will be maintained by means of fluid pressure in the cavities 42 and 56.

Of course, when the assembly is used as a pump, power will be supplied to one or both of the shafts 14 and 15 and a supply of liquid to the chamber 23 will be maintained from a reservoir feeding to the passage 77 or port 13. The shaft 15 will be driven in a counter clockwise direction and the shaft 14 will rotate in a clockwise direction, and liquid will be carried into the region adjacent the meshing region and between the wear plates 25 and 26, and will be forced out through the passage 28, the sleeve 72 and the passage 76.

I claim as my invention:

1. In a device of the class described, a housing defining a chamber closed except for a lateral pressure port and a second port, a pair of gears disposed in said chamber for rotation about parallel axes which are oppositely spaced from the axis of said pressure port and which are located in a common plane perpendicular to the axis of said pressure port, said gears meshing in a region aligned with the axis of said pressure port, a wear block disposed between said port and said gears, having a passage therethrough coaxial with said pressure port and formed with arcuate surfaces respectively confronting and conforming to the peripheries of said gears adjacent said meshing region, said arcuate surfaces extending significantly beyond the opposite axial ends of said gears, a first wear plate and a second wear plate respectively bearing on the opposite axial ends of said gears, each of said wear plates traversing said common plane, spanning said meshing region and being formed to provide, adjacent one end, flaring surfaces confronting and conforming to one extending portion of said arcuate surfaces of said wear block and abutment means restricting movement of said wear plates away from said wear block.

2. The device of claim 1 in which each wear plate is movable toward and away from said wear block and in which a cavity open to said pressure port is defined between said abutment means and that end of each wear plate which is remote from said wear block, and means providing a seal for each cavity.

3. The device of claim 2 including means cooperating with said wear block and with each wear plate to define a pocket in open communication with said pressure port, one wall of each such pocket constituting a surface of one of said wear plates facing away from said gears.

4. The device of claim 1 including means cooperating with said wear block and with each wear plate to define a pocket in open communication with said pressure port, one wall of each such pocket constituting a surface of one of said wear plates facing away from said gears.

5. In a device of the class described, a housing comprising a roof, a floor, and side walls defining with said roof and floor a chamber closed except for a lateral pressure port and a return port, a pair of gears disposed in said chamber for rotation about parallel axes which are oppositely spaced from the axis of said pressure port and which are located in a common plane perpendicular to the axis of said pressure port, said gears meshing in a region aligned with the axis of said pressure port, and a sealing assembly movably disposed in said chamber and comprising a top back-up plate located between said roof and said gears, spanning said meshing region and spaced from said side walls, a bottom back-up plate located between said floor and said gears, spanning said meshing region and spaced from said side walls, a wear block sandwiched between said plates adjacent said pressure port and having a passage therethrough coaxial with said pressure port and aligned with said meshing region, means providing an extensible connection between said passage and said pressure port, said wear block being formed with arcuate surfaces respectively confronting and conforming to the peripheries of said gears adjacent said meshing region and extending into contact with said back-up plates, an upper wear plate interposed between said top back-up plate and said gears, a lower wear plate interposed between said bottom back-up plate and said gears, each wear plate spanning at least a portion of said meshing region and being formed to provide, adjacent one end, flaring surfaces confronting and conforming to said arcuate surfaces of said wear block, each wear plate being formed with a pocket in its face remote from said gears, said wear block being formed to provide a shoulder substantially coplanar with the floor of each such pocket, said pockets being in open communication with said wear block passage, abutment means fixed relative to said back-up plates to retain said flaring surfaces against movement away from said arcuate surfaces, a spacer sandwiched between said back-up plates at a point remote from said wear block, and means connecting said back-up plates.

6. The device of claim 5 in which each wear plate is arranged for limited movement toward and away from said wear block and is formed with a cavity in its end remote from said wear block and to provide open communication between its pocket and its cavity, and resilient washer means providing a seal for each cavity with said abutment means.

7. The device of claim 6 in which said resilient washer means constitutes perimetrally-continuous seal means received in each wear plate cavity and confined between the floor of said cavity and the associated abutment means.

8. The device of claim 5 including cam means carried by said housing and operatively engaging said sealing assembly at a point remote from said wear block to adjust the position of said sealing assembly within said chamber.

9. The device of claim 5 including an axially-movable, perimetrally sealed piston interposed between each back-up plate and the adjacent wear plate and disposed in the pocket of the associated wear plate.

References Cited by the Examiner

UNITED STATES PATENTS

| 164,147 | 6/75 | Conver | 103—126 |
| 2,105,259 | 1/38 | Oshei | 230—141 |
| 2,211,154 | 8/40 | Oshei | 230—141 |
| 2,742,862 | 4/56 | Banker | 103—126 |
| 2,824,524 | 2/58 | Banker | 103—126 |
| 2,855,854 | 10/58 | Aspelin | 102—126 |
| 2,880,678 | 4/59 | Hoffer | 103—126 |
| 2,993,450 | 7/61 | Weigert | 103—126 |
| 2,996,999 | 8/61 | Trautman | 103—126 |

FOREIGN PATENTS

| 644,570 | 5/37 | Germany. |
| 564,198 | 6/57 | Italy. |

KARL J. ALBRECHT, *Primary Examiner.*

WILBUR J. GOODLIN, JOSEPH H. BRANSON, JR.,
*Examiners.*